United States Patent
Bates et al.

(10) Patent No.: US 8,453,237 B2
(45) Date of Patent: May 28, 2013

(54) VERIFICATION OF A SEGMENTED PROGRAM ON A PARALLEL PROCESSING COMPUTING SYSTEM

(75) Inventors: Cary L. Bates, Rochester, MN (US); Christopher A. Peterson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 12/793,076

(22) Filed: Jun. 3, 2010

(65) Prior Publication Data

US 2011/0302651 A1 Dec. 8, 2011

(51) Int. Cl.
*G06F 12/14* (2006.01)

(52) U.S. Cl.
USPC ............................................................ 726/22

(58) Field of Classification Search
None
See application file for complete search history.

(56) References Cited

U.S. PATENT DOCUMENTS 7,103,779 B2 * 9/2006 Kiehtreiber et al. .......... 713/187
7,320,114 B1 * 1/2008 Jain et al. ...................... 716/106

FOREIGN PATENT DOCUMENTS

WO 2005029223 A2 3/2005

OTHER PUBLICATIONS

Bates, et al, IPCOM000183899D, "Background Verification of Signed Program on a Multiprocessing System", published Jun. 4, 2009.
Datamation Product Watch—E-Lock Digital Signature Tools (E-Lock Technologies), http://products.datamation.com/security/encryption/1186123666.html, posted Aug. 3, 2007 by E-Lock Technologies.

* cited by examiner

*Primary Examiner* — Brandon Hoffman
(74) *Attorney, Agent, or Firm* — Wood, Herron & Evans, LLP

(57) ABSTRACT

Embodiments of the invention provide a method, apparatus, and program product to verify a program that includes a plurality of sections with a computing system that is configured to process a plurality of threads of execution. The method comprises verifying and executing a first section of the program utilizing a first thread of execution in response to activation of the program and determining a second section of the program to execute subsequent to the first section. The method further comprises verifying the second section utilizing a second thread of execution in parallel with the execution of the first section. Another embodiment of the invention provides a method of compiling program that includes program code by grouping the program code into sections based upon the execution time of the program code and based upon which program code is most commonly executed.

24 Claims, 5 Drawing Sheets

VERIFICATION OF A SEGMENTED PROGRAM ON A PARALLEL PROCESSING COMPUTING SYSTEM

FIELD OF THE INVENTION

The present invention relates to computing systems, and in particular to verification of computer software executing on computer systems.

BACKGROUND OF THE INVENTION

In computing systems, the user and the underlying operating environment typically wish to prevent the use of unauthorized software that can be used to harm or otherwise degrade the performance of the computing system. Specifically, recent types of malicious or otherwise unwanted software (often called malware, adware, spyware, or bloatware) have often harmed computing systems to the point where the computing system either no longer operates efficiently, has been rendered inoperable, or has been co-opted for nefarious purposes, such as serving more malware, spam e-mails, corporate espionage, or other malicious attacks. As such, attempts have been made to establish trust between both an application that is executed by the computing system and the user or operating environment.

However, it is often difficult to establish trust between an application and the user or operating environment of the computing system. Typical solutions have relied on appending a digital signature to an application and having that signature verified prior to executing the application. When the user or computing system verifies the signature, it serves as an indication that the underlying application is safe to use. However, such signatures can often be faked, allowing attackers to purport that an application is not malicious or otherwise insert program code into the application that in turn is used for malicious purposes. Moreover, signatures generated from an application (e.g., from a hash of the application) often are generated from one portion of the application such that the insertion of malicious program code in another portion of the application can be performed without changing the underlying hash. Still further, there is often a performance impairment when verifying the signature of an application. The verification of the signature may require computing a hash from the application and comparing the hash to the signature of the application. However, computing the hash of an entire application can take a significant amount of time and typically prevents early execution of the application until such verification is complete. This results in a performance impairment of both the computing system upon which the application is being verified due to the intense calculation of the hash as well as a performance impairment of the operation of the application with regard to the user's experience.

Consequently, there is a need for improving the verification of applications so as to minimize both signature faking and effects of insertion of malicious code into a program.

SUMMARY OF THE INVENTION

Embodiments of the invention provide a method, an apparatus, and a program product that parallelize the verification and execution of an application by segmenting the application into sections that can be individually verified, thereby enabling a parallel processing computing system to perform verification of some sections in parallel with the execution of other sections of the application. Specifically, a segmented application consistent with the invention includes a plurality of sections, at least a portion of which, and in exemplary embodiments each of which, includes a signature. The first section of the segmented application is selected and verified, and executed if the verification is successful. A second section of the segmented application is then verified and/or executed in parallel with the verification and/or execution of the first section. Similarly, additional sections of the segmented application can be verified and/or executed in parallel, based, for example, upon the number of parallel threads available in the parallel processing computing system to verify and execute the application. Doing so typically improves the security of the application since multiple sections of the application are digitally signed by separate signatures, rather than using one signature for the entire application.

In addition, in some embodiments of the invention, the sections of the segmented application may be ordered according to the time of execution of the sections, the likelihood of execution of the sections, or some combination thereof. As such, when sections of the segmented application are ordered well and available processing units, elements, and/or hardware threads can complete verification and/or execution of sections that are likely to be run earlier than others, the latency associated with verification is typically reduced because much of the processing associated with verification is performed in the background and in parallel with the execution of the application.

In particular, one embodiment of the invention provides a method of verifying a program of the type that includes a plurality of sections with a computing system of the type that is configured to process a plurality of threads of execution. The method comprises verifying and executing a first section of the program utilizing a first thread of execution in response to activation of the program and determining a second section of the program to execute subsequent to the first section. The method further comprises verifying the second section utilizing a second thread of execution in parallel with the execution of the first section.

An alternative embodiment provides a method of compiling a program that includes program code. The method comprises analyzing the program code to determine which portions of the program code are most commonly executed, analyzing the program code to determine which portions of the program code have the earliest execution time, and portioning the program code into a plurality of sections. The method further comprises organizing at least some of the portions of program code that have the earliest execution time into a first section of the plurality of sections, organizing at least some of the portions of program code that are most commonly executed into a second section of the plurality of sections, and assigning a different verification signature to each of the first and second sections.

It should be understood that the appended drawings are not necessarily to scale, presenting a somewhat simplified representation of various features illustrative of the basic principles of embodiments of the invention. Certain features of the illustrated embodiments may have been enlarged or distorted relative to others to facilitate visualization and clear understanding.

DETAILED DESCRIPTION

Hardware and Software Environment

Figure 1:
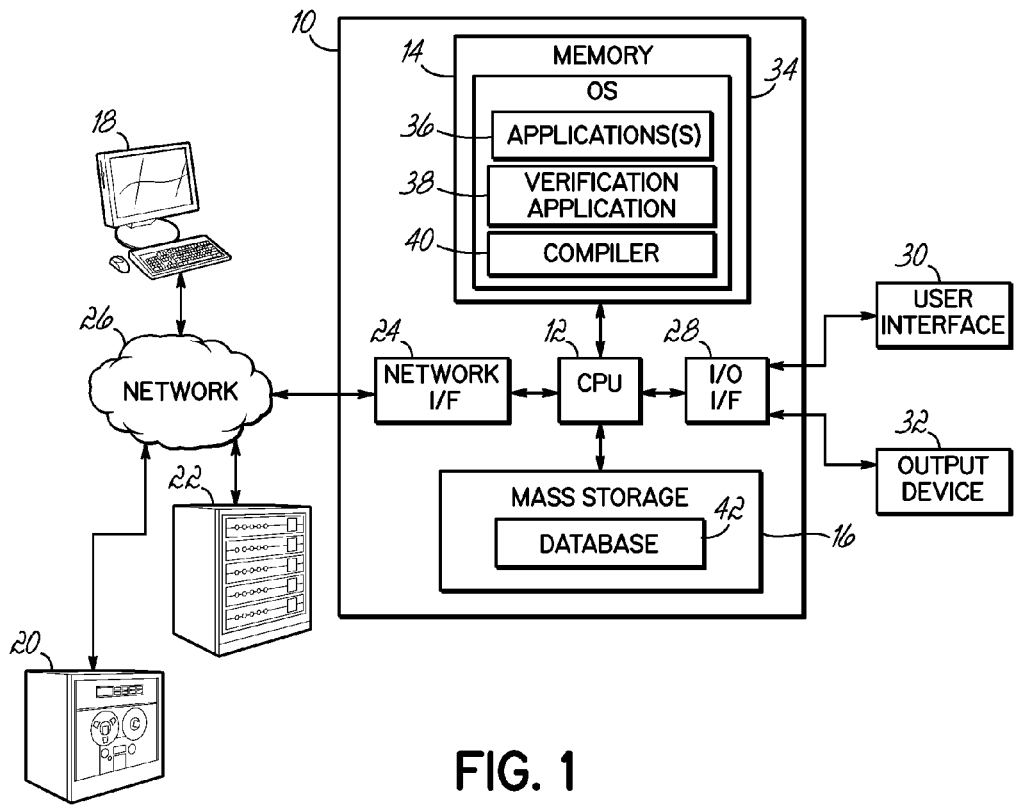
FIG. 1 is a diagrammatic illustration of a hardware and software environment for an apparatus configured to verify, execute, and/or compile a segmented application consistent with embodiments of the invention.

Turning to the drawings, wherein like numbers denote like parts throughout the several views, FIG. 1 is a diagrammatic illustration of a hardware and software environment for an apparatus 10 configured to verify and/or compile a segmented application consistent with embodiments of the invention. Apparatus 10, in specific embodiments, is a computer, computer system, computing device, server, disk array, or programmable device such as a multi-user computer, a single-user computer, a handheld computing device, a networked device (including a computer in a cluster configuration), a mobile telecommunications device, a video game console (or other gaming system), etc. Apparatus 10 may be referred to as a "parallel processing computing system" or a "computing apparatus," but will be referred to hereinafter as a "computing system."

The computing system 10 includes at least one central processing unit ("CPU") 12 coupled to a memory 14. Each CPU 12 is typically implemented in hardware using circuit logic disposed on one or more physical integrated circuit devices or chips. Each CPU 12 may be one or more microprocessors, micro-controllers, field programmable gate arrays, or ASICs, for example. In specific embodiments, each CPU 12 may be one or more microprocessors that utilizes multiple cores, processing elements, pipelines, and/or hardware threads to perform at least two operations in parallel. Memory 14 may include random access memory (RAM), dynamic random access memory (DRAM), static random access memory (SRAM), flash memory, and/or another digital storage medium, and also typically implemented using circuit logic disposed on one or more physical integrated circuit devices, or chips. As such, memory 14 may be considered to include memory storage physically located elsewhere in the computing system 10, e.g., any cache memory in the at least one CPU 12, as well as any storage capacity used as a virtual memory, e.g., as stored on a mass storage device 16, another computing system 18, a network storage device 20 (e.g., a tape drive or backup drive), or another network device 22 (hereinafter, a "server" 22) coupled over a network 26 to computer 10 through at least one network interface 24. Similarly to computing system 10, computing system 18 or server 22, in specific embodiments, is a computer, computer system, computing device, server, disk array, or programmable device such as a multi-user computer, a single-user computer, a handheld computing device, a networked device (including a computer in a cluster configuration), a mobile telecommunications device, a video game console (or other gaming system), etc.

The computing system 10 is coupled to at least one peripheral device through an input/output device interface 28 (illustrated as, and hereinafter, "I/O I/F" 28). In particular, the computing system 12 receives data from a user through at least one user interface 30 (including, for example, a keyboard, mouse, a microphone, and/or other user interface) and/or outputs data to the user through at least one output device 32 (including, for example, a display, speakers, a printer, and/or another output device). Moreover, in some embodiments, the I/O I/F 28 communicates with a device that is operative as a user interface 30 and output device 32 in combination, such as a touch screen display (not shown).

The computing system 10 is typically under the control of an operating system 34 and executes or otherwise relies upon various computer software applications, sequences of operations, components, programs, files, objects, modules, etc., consistent with embodiments of the invention. In specific embodiments, the computing system 10 executes or otherwise relies on an application 36 that includes a plurality of sections (hereinafter, a "segmented application" 36) that can in turn be verified by a verification application 38. Moreover, the computer 10 may include a compiler 40 to compile, or otherwise build, a segmented application 36. In specific embodiments, the computing system 10 is configured with a database 42 or alternative data structure in which to store data associated with the segmented application 36, the verification application 38, and/or the compiler 40 consistent with embodiments of the invention.

Figure 2:
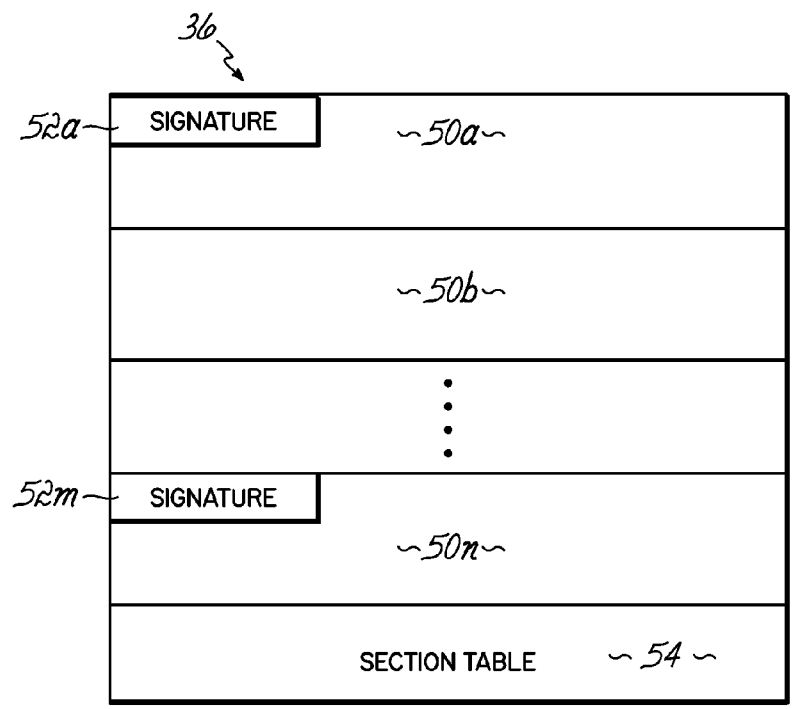
FIG. 2 is a diagrammatic illustration of the segmented application of FIG. 1.

FIG. 2 is a diagrammatic illustration of a segmented application 36 consistent with embodiments of the invention. In some embodiments, the segmented application 36 includes a plurality of program sections 50 (illustrated as sections 50a-n). The sections 50 typically include program code for execution by the computing system 10 and may be configured in a particular order as discussed below. Specifically, the sections 50 of the segmented application 36 may be ordered according to time of execution of each section 50 or frequency of execution of each section 50. In the former example, the sections 50 that are typically executed first are placed before those sections 50 that are typically executed later. In the latter example, the sections 50 that are typically executed the most are placed before those sections 50 that are executed the least. Alternatively, the sections 50 of the segmented application 36 may be ordered according to some combination of time of execution of each section 50 and the frequency of execution of each section 50. At least a portion of the plurality of program sections 50 may include a verification signature 52 (illustrated as signatures 52a-m). As illustrated in FIG. 2, the segmented application 50 may further include a section table 54 that indicates, for each particular section 50, what sections are executed afterward (e.g., what section or sections a particular section "branches" to, otherwise referred to as "branch sections").

Figure 3:
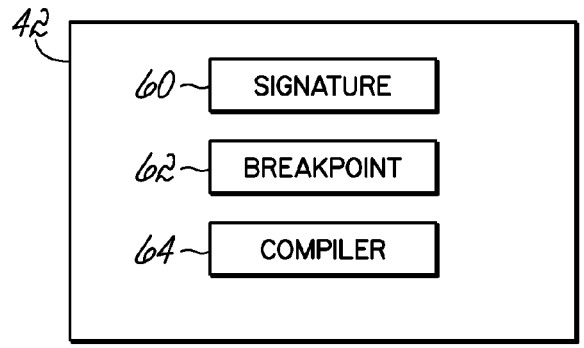
FIG. 3 is a diagrammatic illustration of a database of the apparatus of FIG. 1.

FIG. 3 is a diagrammatic illustration of a plurality of data structures that may be included in the database 42. In some embodiments, the database 42 includes a signature data structure 60, a breakpoint data structure 62, and a compiler data structure 64. The signature data structure 60 is configured to store information about the signatures 52 of a segmented application 36, and in particular may store data that is compared to signatures 52 of a segmented application 36. The breakpoint data structure 62 is configured to store information about breakpoints, and in particular operational codes (hereinafter, "op" codes) of a segmented application 36 that have been replaced by breakpoints. The compiler data structure 64 is configured to store information used by the compiler 40, such as linkers, libraries, and/or additional information used to compile a segmented application 36.

A person having ordinary skill in the art will recognize that the environments illustrated in FIGS. 1-3 are not intended to limit the scope of embodiments of the invention. In particular, computing system 10, computing system 18, and/or server 22 may include fewer or additional components consistent with alternative embodiments of the invention. Indeed, a person having skill in the art will recognize that other alternative hardware and/or software environments may be used without departing from the scope of the invention. For example, the segmented application 36 may include more or fewer sections 50, signatures 52 and/or section tables 54, while the verification application 38 may be configured with fewer or additional modules. In some embodiments, each section 50 of the segmented application 36 includes a signature 52, while in alternative embodiments only a portion of the sections 50 of the segmented application 36 include a signature 52. Moreover, the database 42 may be configured with more or fewer data structures. Additionally, a person having ordinary skill in the art will appreciate that the computing system 10 may include more or fewer applications (e.g., segmented applications or non-segmented applications) disposed therein. As such, other alternative hardware and software environments may be used without departing from the scope of embodiments of the invention.

The routines executed to implement the embodiments of the invention, whether implemented as part of an operating system or a specific application, component, program, object, module or sequence of instructions executed by one or more computing systems will be referred to herein as a "sequence of operations," a "program product," or, more simply, "program code." The program code typically comprises one or more instructions that are resident at various times in various memory and storage devices in a computing system, and that, when read and executed by one or more processors of the computing system, cause that computing system to perform the steps necessary to execute steps, elements, and/or blocks embodying the various aspects of the invention.

While the invention has and hereinafter will be described in the context of fully functioning computing systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to non-transitory, recordable type media such as volatile and non-volatile memory devices, floppy and other removable disks, hard disk drives, flash memory drives, and optical disks (e.g., CD-ROM's, DVD's, etc.), among others.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Software Description and Flows

Figure 4:
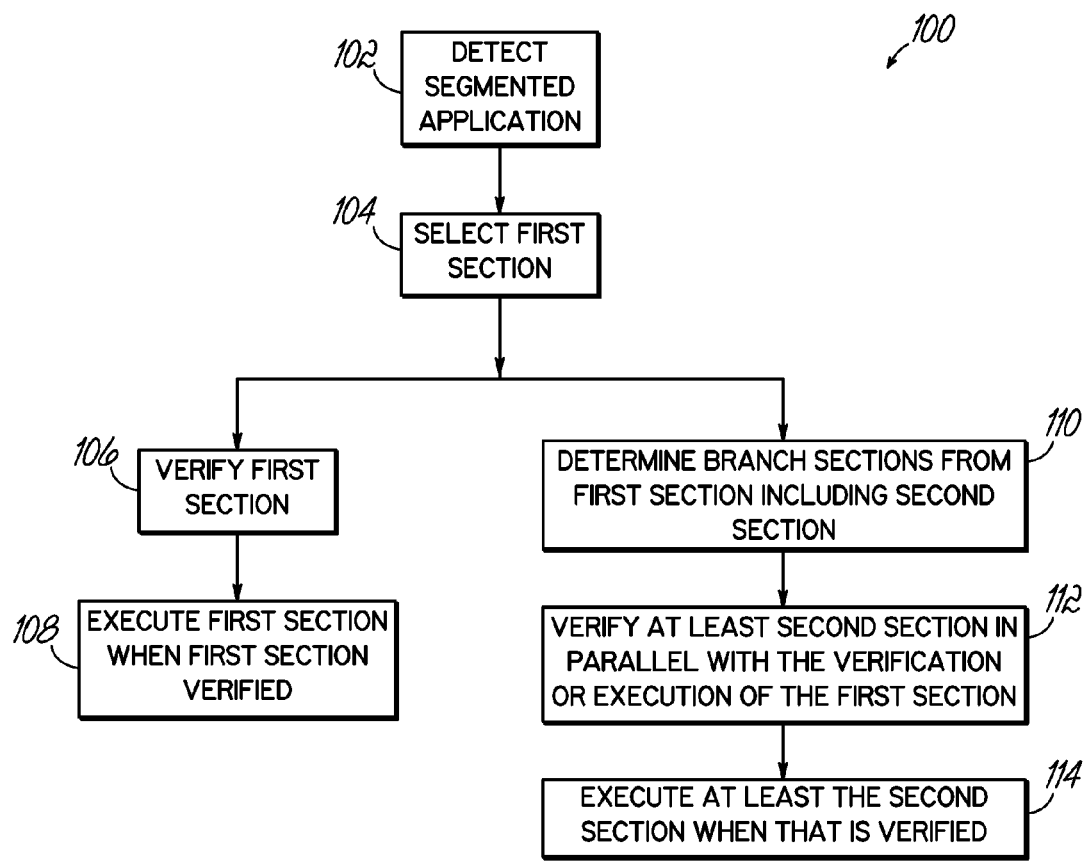
FIG. 4 is a flowchart illustrating a sequence of operations for a program to verify and execute a plurality of sections of the segmented application of FIG. 1 in parallel.

FIG. 4 is a flowchart 100 illustrating of a sequence of operations for a program (such as a verification application) to verify and execute a segmented application. In particular, the program detects activation of the segmented application (block 102) and selects the first section of that segmented application to verify (block 104). In response to selecting the first section, the program verifies the first section (block 106) and executes the first section after the first section has been verified (block 108).

Consistent with embodiments of the invention, a second section of the segmented application is verified and/or executed in parallel with the verification and/or execution of the first section. Specifically, the program may utilize the multithreading capabilities of a computer, or utilize separate cores, processing elements, and/or hardware threads of one or more processors to verify and/or execute at least two sections of a segmented program in parallel. As such, the program determines each branch section of first section, including the second section (block 110). Specifically, the program may determine the branch sections from a section table associated with the segmented application and/or an analysis of the program code of the first section itself. In response to determining the branch sections from the first section, the program verifies at least the second section in parallel with the verification and/or execution of the first section (block 112). The program then executes at least the second section with the at least second section has been verified (block 114).

One having ordinary skill in the art will appreciate that embodiments of the invention may be used to verify and/or execute at least two sections of a segmented application in parallel, whether those two sections are at least the first and second sections, alternative consecutive sections, or other non-consecutive sections. Thus, consistent with embodiments of the invention, at least two sections of a segmented program, each of which includes a signature, can be verified and/or executed in parallel. Specifically, the number of the plurality of sections of a segmented program that may be verified and/or executed in parallel may depend upon the capabilities of the computing system upon which such verification and/or execution is being performed, and more particularly upon the plurality of threads, pipelines, and/or processing elements configured on the computing system.

Figure 5:
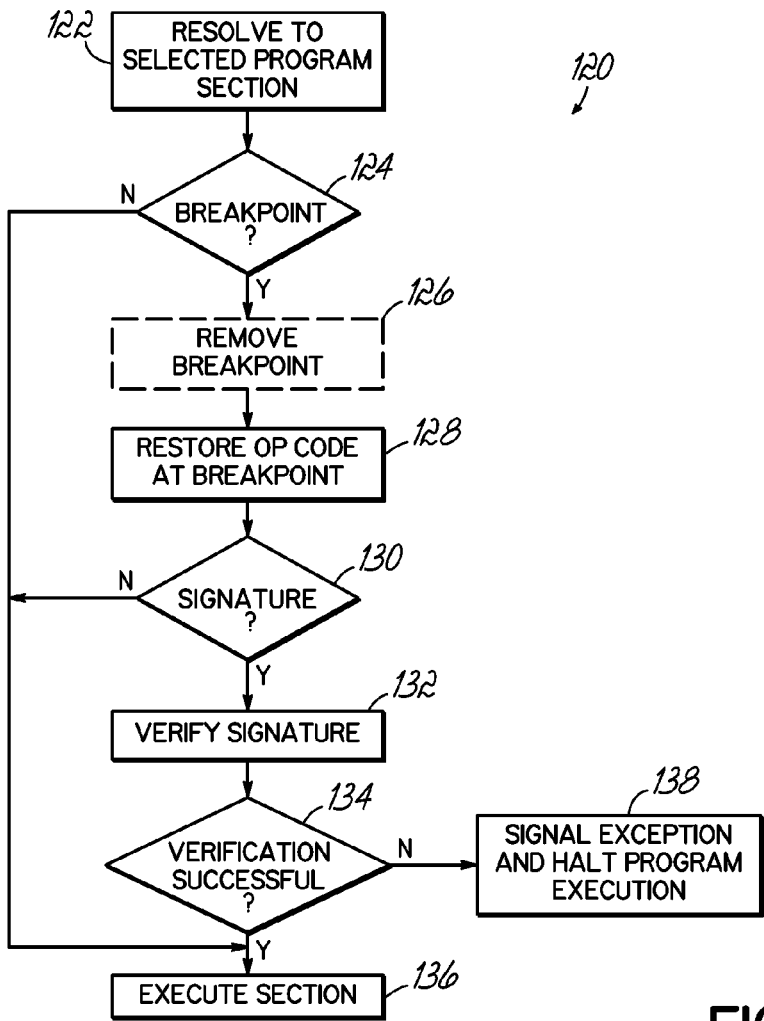
FIG. 5 is a flowchart illustrating a sequence of operations that in turn indicates additional detail for the program to verify a particular section of the segmented application of FIG. 1.

FIG. 5 is a flowchart 120 illustrating a sequence of operations that in turn indicates additional detail for the program to verify a selected section of a segmented program. In particular, the program initially resolves to a selected section as described above (e.g., such as when a section is initially selected for verification) (block 122). The program then determines if there is a breakpoint at the section (block 124). For example, before a section has been verified the program may establish a breakpoint associated with a section as discussed below. When there is a breakpoint in the section ("Yes" branch of decision block 124) the program removes the breakpoint (block 126) and optionally restores an operational code (hereinafter, "op" code) that the breakpoint may have previously replaced (block 128).

In some embodiments, and in particular after restoring an op code, the program determines whether the section includes a signature (block 130). When the program includes a signature ("Yes" branch of decision block 130) the program verifies the signature (block 132) and determines whether the verification was successful (block 134). Specifically, the program verifies a section by comparing the determined signature for that section with a second signature. In specific embodiments, the program compares the determined signature to a second signature stored in a memory. Alternatively, the program may use a second signature that it retrieves or otherwise receives across a network, such as a local area network or a publicly available network, such as the Internet. Still further alternatively, the second signature may be a hash generated by the program itself by analyzing the program code of the section, which is then compared to the determined signature. In any event, when the determined signature and the second signature match, the section is verified successfully ("Yes" branch of decision block 134) and the section is executed (block 136). However, when the determined signature does not match the second signature ("No" branch of decision block 134) the program signals an exception and halts execution (block 138). When a section does not include a breakpoint ("No" branch of decision block 124) or when a section does not include a signature ("No" branch of decision block 130), the section may be executed (block 136) or, alternatively (and particularly where a signature is expected but not located), the program may again signal an exception and halt program execution (block 138). In alternative embodiments, and with respect to the flowchart 120, a breakpoint may not be removed and an op code may not be restored until after a section has been verified.

Figure 6:
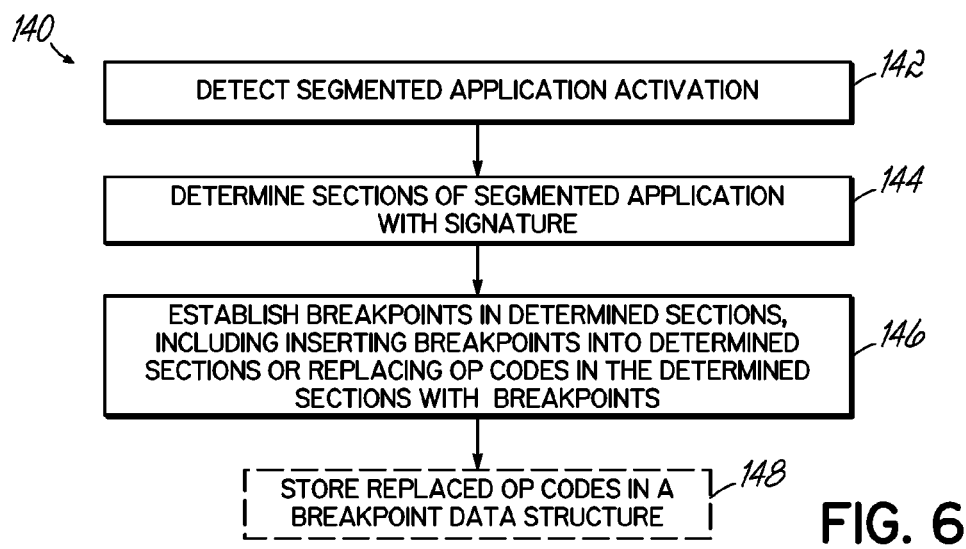
FIG. 6 is a flowchart illustrating a sequence of operations to insert a breakpoint into at least some sections of the segmented application of FIG. 1 upon activation of the segmented application.

In some embodiments of the invention, the program is configured to insert breakpoints into at least some sections of a segmented application upon activation of the segmented application. Specifically, the program may replace an op code in a section with a program code "trap" that acts to halt execution of the section. As such, FIG. 6 is a flowchart 140 illustrating a sequence of operations to insert a breakpoint into at least one section of a segmented application consistent with embodiments of the invention. In particular, the program detects activation of a segmented application (block 142) and, in an optional step, determines which sections of the segmented application includes signatures (block 144). As such, the program establishes breakpoints in all the sections of the segmented application, or, alternatively, those sections that are associated with signatures (block 146). More specifically, the program establishes a breakpoint by inserting a breakpoint into a section or by replacing an op code in a section with a breakpoint. In the embodiments in which an op code is replaced, the program may store the original op code in a breakpoint data structure (block 148).

Figure 7:
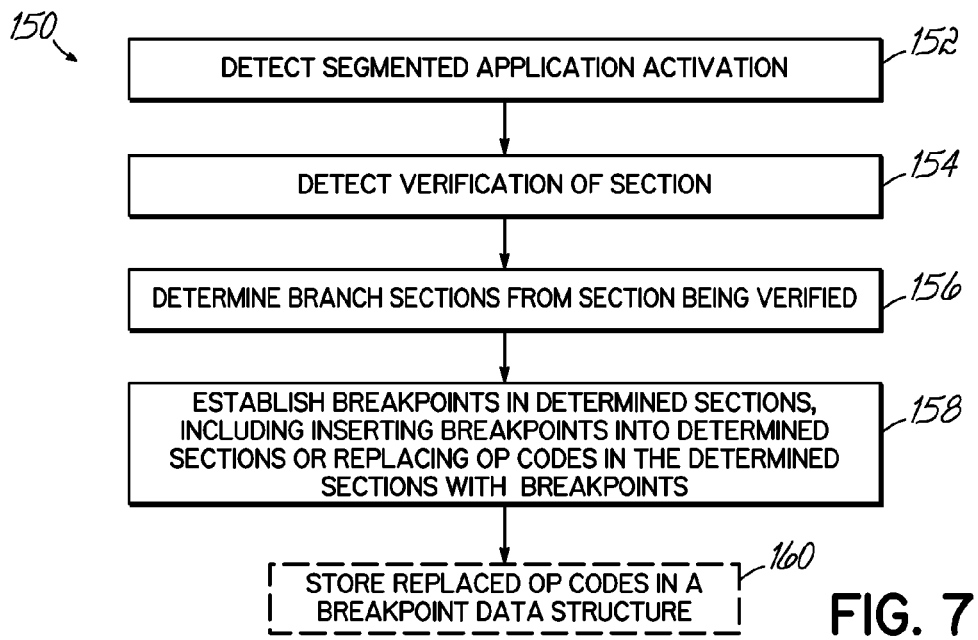
FIG. 7 is a flowchart illustrating a sequence of operations to insert a breakpoint into at least one section of the segmented application of FIG. 1 as at least one other section of the segmented application is verified and/or executed.

In alternative embodiments of the invention, the program is configured to insert breakpoints into at least some sections of a segmented application while another section of that segmented application is verified and/or executed (e.g., "on-the-fly"). As such, FIG. 7 is a flowchart 150 illustrating a sequence of operations to insert a breakpoint into at least one section of a segmented application as at least one other section of that segmented application is verified and/or executed. In particular, the program detects activation of a segmented application (block 152) and determines when a section of the segmented application is being verified (block 154). The program then determines which sections are branched to by the section being verified (block 156). In particular, the program may determine which sections are branched to by a particular section based upon information in the section table of a segmented application and/or an analysis of the program code of the section being verified. In any event, the program establishes breakpoints in all the unverified sections of the segmented application that are branched to by the section being verified (block 158). More specifically, the program establishes a breakpoint by inserting a breakpoint into a section or by replacing an op code in a section with a breakpoint. In the embodiments in which an op code is replaced, the program may store the original op code in a breakpoint data structure (block 160).

A segmented application may be compiled based on information associated with the execution of the source code utilized in that segmented application. In particular, the information may include what source code is executed and how early that source code is executed and may be determined through virtualizations of the segmented application and/or test programs that utilize the source code. In particular, one algorithm for dividing up the source code into sections may be of the type known as a "greedy" algorithm. In such an algorithm, groups of source code are grouped by execution time into basic blocks (a common unit used for compiler optimization) based upon information from test programs that utilize the source code for the future segmented application. The sections may then be ordered based upon execution time and/or the number of test programs that actually executed particular sections of program code. For example, the following algorithm (illustrating program code functionality, but not actual program code) may be utilized to group and order source code for a segmented application such that the most commonly executed parts are in sections together, minimizing the number of sections that require verification.

```
Make_Section (set)
{
   Add all basic blocks that are executed by all test programs in set to
   this section
   FOR all branches from basic blocks of source code in this section
   {
      IF branch to a location that is not in any section
      THEN
         IF the target basic block is executed by more test programs than
            SAVED_BLOCK
         THEN
            SAVED_BLOCK = this basic block
   }
   IF SAVED_BLOCK != NIL
   THEN
      NEXT_SET = all test programs that executed SAVED_BLOCK
   IF SET != NIL
   THEN
      Make_Section (set+1)
   ELSE
      Add all unexecuted basic blocks to a new section
}
set = All test programs run for profiling of the source code
Make_Section(set);
```

Figure 8:
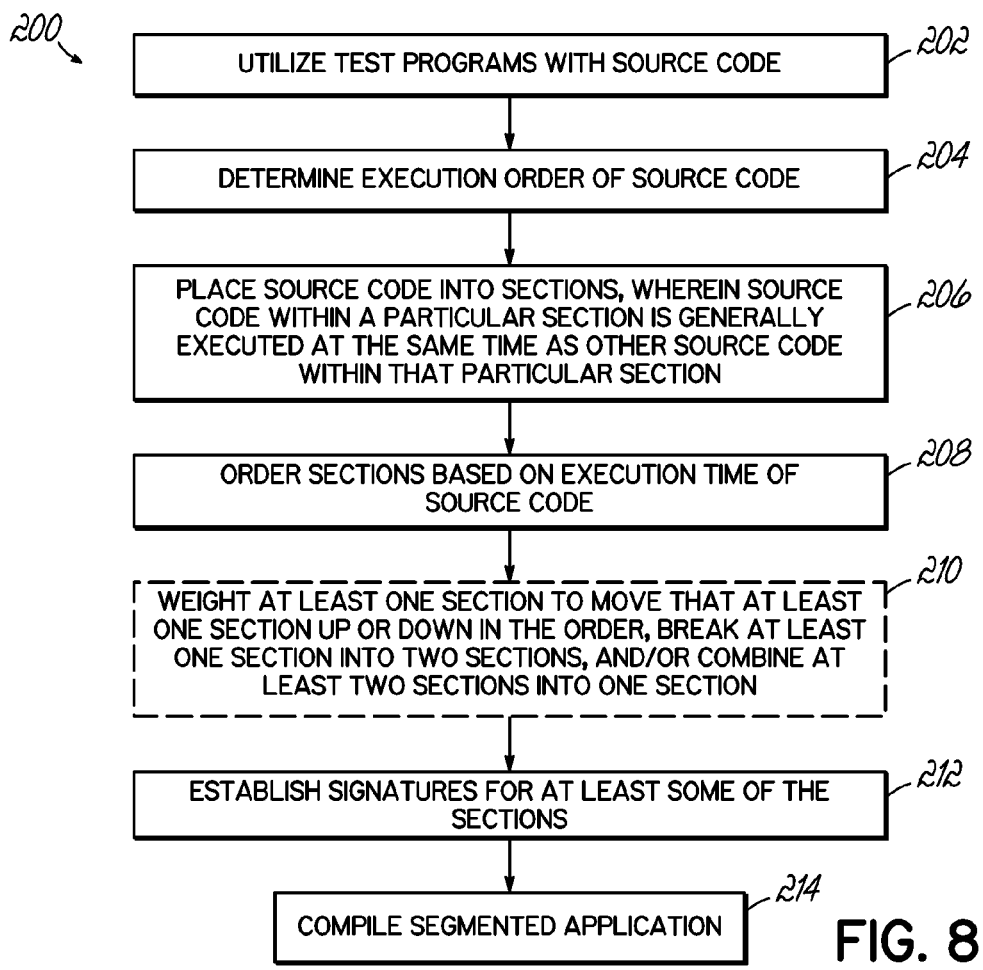
FIG. 8 is a flowchart illustrating a sequence of operations for a program to compile source code into sections of a segmented application according to the time in which that source code is executed consistent with embodiments of the invention.

Alternative embodiments may utilize a weighted approach to order sections, utilize larger or smaller sections than the aforementioned basic blocks, split some sections into two separate sections, and/or combine two separate sections into a third section as required. Once sections are established, all the sections, or, alternatively, a subset of the sections, is individually signed to be individually verified Thus, and consistent with some embodiments of the invention, a segmented application that includes a plurality of sections ordered according to the time in which they are executed may be compiled. FIG. 8 is a flowchart 200 illustrating a sequence of operations for a program (such as a compiler) to compile source code into sections of a segmented application. In particular, test programs that utilize source code for a future segmented application are executed (block 202) and, utilizing information from the test programs, an execution order of the source code is determined (block 204). Specifically, the program may utilize test programs that indicates what line or group of lines of source code are executed before others and the interrelationships therebetween. As such, the program places the source code into a plurality of sections, wherein source code within a particular section is generally executed at the same time as other source code within that particular section (block 206). The program code then orders the sections based on the execution time of the source code within those sections (block 208). Thus, if one line or group of lines of source code is executed first and a second line or group of lines of source code is executed second, that first line or group of lines may be placed in a first section while the second line or group of lines is placed in a second section subsequent to that first section, and so on.

At times, the sections of the source code may need to be weighted to adjust their order in the segmented application. For example, a first section that is critical for operation of a segmented application may be typically executed later than another second section, but may be moved ahead such that that first section is verified and/or executed earlier than the second section. Alternatively, at least one section may include a plurality of lines of source code that are executed at about the same time. However, this section may be larger than other sections and thus is may be inefficient to include such a large section in the segmented application. Similarly, at least two small sections may be executed at about the same time, but it may be more efficient to combine those sections into one slightly larger section. Thus, in an optional step, at least one section may be weighted to move that section up or down in the order, at least one section may be broken up into two sections, and/or at least two sections may be combined into a third section (block 210). The program may then establish signatures for at least some of the sections (and, in specific embodiments, for each of the sections) (block 212) and compile the segmented application (block 214). During compilation, the program may generate and append a section table to the segmented application to provide future applications with an indication of the branch sections of each individual sections.

Figure 9:
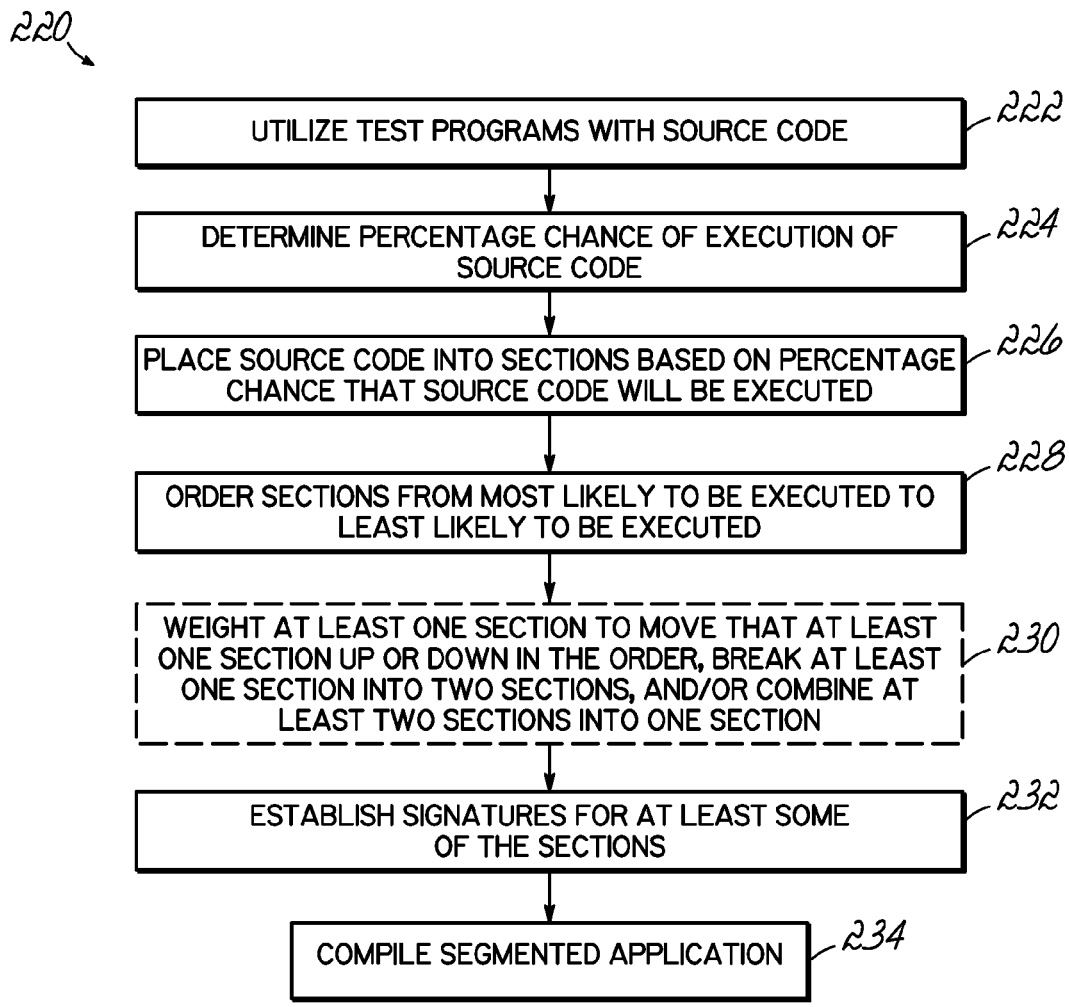
FIG. 9 is a flowchart 220 illustrating a sequence of operations for a program to compile source code into sections of a segmented application according to the likelihood of execution of that source code consistent with embodiments of the invention.

Consistent with alternative embodiments of the invention, a segmented application that includes a plurality of sections ordered according to the likelihood of their execution may be compiled. FIG. 9 is a flowchart 220 illustrating a sequence of operations to compile source code into sections of a segmented application. In particular, test programs that utilize the source code for a future segmented application are executed (block 222) and, utilizing information from the test programs, the percentage chance of execution of a particular line or group of lines of source code is determined (block 224). Specifically, the program may utilize the results from the test program to determine the likelihood that a particular line or group of lines of source code are executed. As such, the program places the source code into a plurality of sections, wherein source code within a particular section has the same likelihood of being executed (block 226). The program code then orders the sections based on the likelihood that the source code within those sections will be executed (block 228). Thus, a first line or group of lines of source code that is most likely to be executed may be placed in a first section, while a second line or group of lines of source code that is slightly less likely to be executed may be placed in a second section subsequent to the first section, and so on.

As discussed above, at least one section may be weighted to move that section up or down in the order, at least one section may be broken up into two sections, and/or at least two sections may be combined into a third section (block 230). The program may then establish signatures for at least some of the sections (and, in specific embodiments, for each of the sections) (block 232) and compile the segmented application (block 234). During compilation, the program may generate and append a section table to the segmented application to provide future applications with an indication of the branch sections of each individual sections.

In some embodiments and as discussed above, source code in a first section may be separated into two sections or combined with the source code in a second section to make a third section. Specifically, two sections may be combined when they are both branched to by a third section, when the two sections are close in order, when the two sections are relatively small in comparison to other sections or a predetermined length, and/or for an alternative reason relating to the efficiency of operation of the segmented application (such as, for example, that the data utilized by two sections is the same, and thus memory requests for that data are reduced). Correspondingly, a first section may be split into second and third sections if that first section is relatively large in comparison to other sections or a predetermined length, if one line or group of source code within the first section executes must faster or slower than another line or group of source code within the first section, and/or for an alternative reason relating to the efficiency of operation of the segmented application (such as, for example, the memory required to execute or otherwise load that first section being too large).

While the present invention has been illustrated by a description of the various embodiments, and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. In particular, a person having ordinary skill in the art will appreciate that any of the blocks of the above flowcharts may be deleted, augmented, made to be simultaneous with another, combined, or be otherwise altered in accordance with the principles of the embodiments of the invention. Accordingly, departures may be made from such details without departing from the spirit or scope of applicant's general inventive concept.

What is claimed is:

1. A method of verifying a program of the type that includes a plurality of sections with a computing system of the type that is configured to process a plurality of threads of execution, the method comprising:

in response to activation of the program, verifying a signature of a first section of the program;

executing the first section of the program utilizing a first thread of execution after the signature of the first section of the program has been verified;

determining a second section of the program to execute subsequent to the first section; and verifying a signature of the second section utilizing a second thread of execution in parallel with the execution of the first section by the first thread of execution.

2. The method of claim 1, further comprising:
preventing execution of the second section until the second section is verified.

3. The method of claim 2, wherein preventing execution of the second section includes:
establishing a breakpoint associated with the second section.

4. The method of claim 3, wherein establishing the breakpoint includes:
replacing an operational code associated with the second section with the breakpoint.

5. The method of claim 4, further comprising:
in response to verifying the second section, replacing the breakpoint with the operational code.

6. The method of claim 1, wherein verifying the signature of the second section includes:
determining the signature associated with the second section;
comparing the signature to a stored signature; and
in response to determining that the signature matches the stored signature, executing the second section.

7. The method of claim 1, wherein the data associated with the first section is stored in a section table that indicates which of the plurality of sections of the program to execute subsequent to the first section.

8. The method of claim 7, wherein determining the second section of the program to execute subsequent to the first section includes:
determining a group of sections of the program to execute subsequent to the first section, the group including the second section.

9. The method of claim 8, further comprising:
establishing a breakpoint in each of the group of sections of the program to execute subsequent to the first section.

10. The method of claim 8, further comprising:
concurrently verifying at least some of the group of sections with a corresponding number of threads of execution in parallel with the execution of the first section.

11. The method of claim 1, the method further comprising:
executing the second section with a third thread of execution in parallel with verifying a third section of the program with a fourth thread of execution.

12. A method of compiling a program that includes program code, comprising:
analyzing the program code to determine which portions of the program code are most commonly executed;
analyzing the program code to determine which portions of the program code have the earliest execution time;
portioning the program code into a plurality of sections;
organizing at least some of the portions of program code that have the earliest execution time into a first section of the plurality of sections;
organizing at least some of the portions of program code that are most commonly executed into a second section of the plurality of sections; and
assigning a different verification signature to each of the first and second sections.

13. An apparatus, comprising:
at least one processing unit configured to process a plurality of threads of execution; and
a memory containing program code, the program code configured to, when executed by the at least one processing unit, verify a signature of a first section of a program in response to activation of the program, execute the first section of the program utilizing a first thread of execution after the signature of the first section of the program has been verified, determine a second section of the program to execute subsequent to the first section, and verify a signature of the second section utilizing a second thread of execution in parallel with the execution of the first section by the first thread of execution.

14. The apparatus of claim 13, wherein the program code is further configured to prevent execution of the second section until the second section is verified.

15. The apparatus of claim 14, wherein the program code is further configured to establish a breakpoint associated with the second section.

16. The apparatus of claim 15, wherein the program code is further configured to replace an operational code associated with the second section with the breakpoint.

17. The apparatus of claim 16, wherein the program code is further configured to replace the breakpoint with the operational code in response to verifying the second section.

18. The apparatus of claim 13, wherein the program code is further configured to determine the signature associated with the second section, compare the signature to a stored signature, and execute the second section in response to determining that the signature matches the stored signature.

19. The apparatus of claim 13, wherein the data associated with the first section is stored in a section table that indicates which of the plurality of sections of the program to execute subsequent to the first section.

20. The apparatus of claim 19, wherein the program code is further configured to determine a group of sections of the program to execute subsequent to the first section, the group including the second section.

21. The apparatus of claim 20, wherein the program code is further configured to establish a breakpoint in each of the group of sections of the program to execute subsequent to the first section.

22. The apparatus of claim 20, wherein the program code is further configured to concurrently verify at least some of the group of sections with a corresponding number of threads of execution in parallel with the execution of the first section.

23. The apparatus of claim 13, wherein the program code is further configured to execute the second section with a third thread of execution in parallel with verifying a third section of the program with a fourth thread of execution.

24. A program product, comprising:
program code for verifying a program of the type that includes a plurality of sections in a computing system of the type that is configured to process a plurality of threads of execution, the program code configured to, when executed by at least one processing unit of the computing system, verify a signature of a first section of a program in response to activation of the program, execute the first section of the program utilizing a first thread of execution after the signature of the first section of the program has been verified, determine a second section of the program to execute subsequent to the first section, and verify a signature of the second section utilizing a second thread of execution in parallel with the execution of the first section by the first thread of execution; and
a computer readable device bearing the program code.

* * * * *